United States Patent
Luhrs et al.

(10) Patent No.: US 9,842,157 B2
(45) Date of Patent: Dec. 12, 2017

(54) SYSTEMS AND METHODS FOR CLASSIFYING COMPUTING DEVICES BASED ON DEVICE ATTRIBUTES

(71) Applicant: Facebook, Inc., Menlo Park, CA (US)

(72) Inventors: Christopher Luhrs, Menlo Park, CA (US); Flynn John Heiss, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 351 days.

(21) Appl. No.: 14/642,314

(22) Filed: Mar. 9, 2015

(65) Prior Publication Data

US 2016/0267164 A1    Sep. 15, 2016

(51) Int. Cl.
*G06F 17/30* (2006.01)

(52) U.S. Cl.
CPC .............. *G06F 17/30598* (2013.01)

(58) Field of Classification Search
CPC . G06F 7/30598; G06F 17/30601; G06F 17/30
See application file for complete search history.

(56) References Cited

U.S. PATENT DOCUMENTS

| 2013/0179561 A1* | 7/2013 | Tripathi | ............. | H04N 21/4532 |
| | | | | 709/224 |
| 2014/0115606 A1* | 4/2014 | Hamzata | ................... | G06F 9/46 |
| | | | | 719/313 |

OTHER PUBLICATIONS

Marra et al., "Year class: A classification system for Android", published on Nov. 6, 2014, pp. 5.*
Alex Barredo, "A comprehensive look at smartphone screen size statistics and trends", published on May 28, 2014, pp. 7.*
J. H. Park, Y. B. Park and H. K. Ham, "Fragmentation Problem in Android," 2013 International Conference on Information Science and Applications (ICISA), Suwon, 2013, pp. 1-2.*
Damith Rajapakse, "Device Fragmentation of Mobile Applicaitons," Feb. 19, 2014 <https://web.archive.org/web/20140219011657/http://www.comp.nus.edu.sg:80/~damithch/df/device-fragmentation.htm>.*

* cited by examiner

*Primary Examiner* — Syed Hasan
(74) *Attorney, Agent, or Firm* — Sheppard, Mullin, Richter & Hampton LLP

(57) ABSTRACT

Systems, methods, and non-transitory computer-readable media can acquire a set of attributes for each computing device of a plurality of computing devices. The set of attributes can be associated with device performance. Each computing device of the plurality of computing devices can be classified into a device class year of a plurality of class years based at least in part on the set of attributes. The device class year can correspond to a level of device performance associated with the set of attributes. At least one feature to be provided on the computing device can be enabled based at least in part on the device class year.

17 Claims, 7 Drawing Sheets

300 ↙

| Year | # of Cores | Clock | RAM |
|---|---|---|---|
| 2008 | 1 | 528MHz | 192MB |
| 2009 | n/a | 600MHz | 290MB |
| 2010 | n/a | 1.0GHz | 512MB |
| 2011 | 2 | 1.2GHz | 1.0GB |
| 2012 | 4 | 1.5GHz | 1.5GB |
| 2013 | n/a | 2.0GHz | 2.0GB |
| 2014 | n/a | >2.0GHz | >2.0GB |

| Device | # of Cores | Clock | RAM | Median |
|---|---|---|---|---|
| A | 1 (2008) | 1.0GHZ (2010) | 768MB (2011) | 2010 |
| B | 2 (2011) | 1.2GHz (2011) | 1.0GB (2011) | 2011 |
| C | 2 (2011) | 1.7GHz (2013) | 2.0GB (2013) | 2013 |
| D | 1 (2008) | 600MHz (2009) | 192MB (2008) | 2008 |
| E | 4 (2012) | 2.5GHz (2014) | 2.0GB (2013) | 2013 |

FIGURE 3B

SYSTEMS AND METHODS FOR CLASSIFYING COMPUTING DEVICES BASED ON DEVICE ATTRIBUTES

FIELD OF THE INVENTION

The present technology relates to the field of data analytics. More particularly, the present technology relates to techniques for classifying a computing device based on the device's attributes or capabilities.

BACKGROUND

Today, people often utilize computing devices (or systems) for a wide variety of purposes. Users can use their computing devices to, for example, interact with one another, create content, share information, and access information. In some cases, a user of a social networking system (or service) can utilize his or her computing device to engage in such activities as viewing, creating, and sharing media content, such as images and videos, at the social networking system. A user's experience engaging in these activities, however, can vary based on the capabilities of his or her computing device. With so many different devices, being able to segment users and their devices to better understand usage patterns and performance can be a challenge.

Under conventional approaches, computing devices have been segmented based on different operating system (OS) versions. This approach had been sufficient since newer OS versions had correlated with newer and, consequently, higher performing devices and older OS versions had correlated with older and, thus, comparatively lesser performing devices. As such, newer more resource hungry features may only have been rolled out to devices running the newest OS version.

SUMMARY

Various embodiments of the present disclosure can include systems, methods, and non-transitory computer readable media configured to acquire a set of attributes for each computing device of a plurality of computing devices. The set of attributes can be associated with device performance. Each computing device of the plurality of computing devices can be classified into a device class year of a plurality of class years based at least in part on the set of attributes. The device class year can correspond to a level of device performance associated with the set of attributes. At least one feature to be provided on the computing device can be enabled based at least in part on the device class year.

In at least one embodiment, the set of attributes includes one or more of processor speed, memory, a number of central processing unit cores, display screen size, pixel density of the display screen, or battery life.

In at least one embodiment, classifying each computing device includes determining an attribute class year corresponding to when each attribute of the set of attributes was the highest performing attribute. Once the attribute class year has been determined, a device class year can be assigned based on a mean or median of the years when each attribute of the acquired set of attributes was the highest performing attribute.

In at least one embodiment, a computing system can classify a first computing device into a first device class year and classify a second computing device into a second more recent device class year. In this embodiment, the system can provide the first computing device with at least one first feature and the second computing device with at least one second feature where the second feature is associated with a higher level of device performance relative to the first feature.

In at least one embodiment, the at least one first feature can be a first number of videos and the at least one second feature is a second larger number of videos.

In at least one embodiment, the at least one first feature can be associated with displaying first content at a first frequency and the at least one second feature can be associated with displaying the first content at a second more frequent frequency relative to the first frequency.

In at least one embodiment, based at least in part on the second device class year, the first content can be prioritized on the second computing device over second content and, based at least in part on the first device class year, the second content can be prioritized on the first computing device over the first content since the first content requires a higher level of device performance.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 3A illustrates an example table of attribute class years, according to an embodiment of the present disclosure.

FIG. 3B illustrates an example table of computing devices classified by class year, according to an embodiment of the present disclosure.

Figure 1:
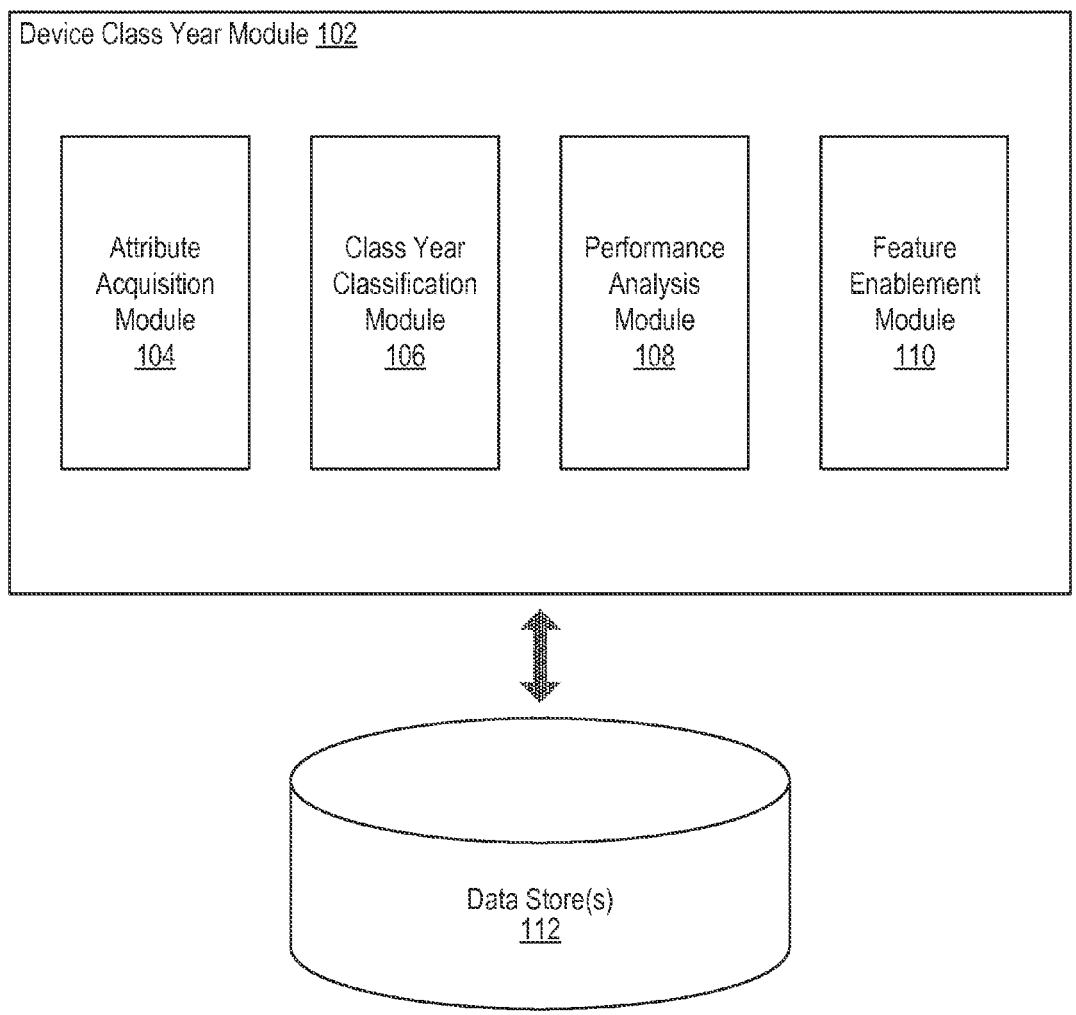
FIG. 1 illustrates an example system including an example device class year classification module configured to classify computing devices based on device attributes in accordance with at least one embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Classifying Computing Devices Based on Device Attributes

People use computing devices (or systems) for a wide variety of purposes. Computing devices can provide different kinds of functionality, thus, enabling users to produce, access, and share content and information. In some cases, users can utilize computing devices to interact or engage with a social networking system (i.e., a social networking service, a social network, etc.) where users can, for example, provide, post, or publish content, such as text, notes, status updates, links, pictures, videos, audio, and the like. Performance of the computing devices can impact user experience with such content.

A recent explosion of more affordable computing devices using popular operating systems (e.g., Android OS) has made the correlation between device performance and OS version less apparent. For example, a higher performing device may in one country be running on an older OS relative to a lesser performing device running the newest version of the same OS. As such, conventional segmenting approaches may misclassify a device. Such misclassification may undesirably result in providing features that the device is not configured to execute or not providing features a user has come to expect from a particular device. Accordingly, these and other similar concerns of conventional approaches can, therefore, reduce the overall user experience associated with viewing, consuming, or otherwise accessing content.

Thousands of computing devices are released each year and the range of performance on these devices is quite broad. Some devices can fluidly scroll complicated layouts without dropping a frame while other devices (e.g., devices with less memory and/or a single processor core, etc.) introduced in the same year, do not fare as well. Accordingly, a way to group thousands of devices into tiers of performance can be desirable to analyze how usage of a client-side application varies on different devices and to potentially tune the behavior of the client-side application to better match the hardware of a respective tier of devices.

Therefore, an improved approach can be beneficial for addressing or alleviating various concerns associated with conventional approaches. Accordingly, various embodiments of the disclosed technology can classify or categorize a computing device, such as a phone, by the year when that device would have been considered the best device on the market. For example, a computing system can acquire a set of attributes for computing devices associated with a service, such as a social networking service, provided by the computing system. These attributes are features of or associated with a computing device that impact device performance, such as processor speed, memory, or a number of central processing unit (CPU) cores. Other such attributes include display screen size, display screen pixel density, battery life, or any other variable attribute or feature of the device that may impact device performance.

Accordingly, based on these attributes, the computing system classifies each computing device into a device class year. Since these attributes are more closely tied to device performance, the class year effectively groups computing device by similar performance capabilities, regardless of what year a particular device was released. Such a grouping can make understanding performance of, for example, a client-side application associated with the computing system easier. Upon understanding the performance capabilities and/or limitations of the devices among different class years, the computing system can enable or provide features to devices associated with a class year that can appropriately handle or execute those features. Similarly, the computing system can also limit the features provided to devices associated with a class year known to be unable to appropriately handle or execute those features.

FIG. 1 illustrates example system 100 including example computing device class year module 102 configured to facilitate the classification of computing devices based on device attributes in accordance with at least one embodiment of the present disclosure. As shown in FIG. 1, device class year module 102 includes attribute acquisition module 104, class year classification module 106, performance analysis module 108, and feature enablement module 110. In some instances, example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, device class year module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, device class year module 102 can be implemented, in part or in whole, as software running on one or more computing devices or systems, such as on a server or user or client computing device. For example, device class year module 102 or at least a portion thereof can be implemented as or within an application (e.g., app), a program, or an applet, etc., running on a user computing device or a client computing system, such as user device 610 of FIG. 6. In another example, device class year module 102 or at least a portion thereof can be implemented using one or more computing devices or systems that include one or more servers, such as network servers or cloud servers. In some instances, device class year module 102 can, in part or in whole, be implemented within or configured to operate in conjunction with a social networking system (or service), such as social networking system 630 of FIG. 6. It should be understood that there can be many variations or other possibilities.

Furthermore, in some embodiments, device class year module 102 can be configured to communicate and/or operate with at least one data store 112, as shown in example system 100. Data store 112 can be configured to store and maintain various types of data. In some implementations, data store 112 can store information associated with the social networking system (e.g., social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, data store 112 can store information associated with users, such as user identifiers, user information, profile information, user specified settings, content produced or posted by users, and various other types of user data. In some embodiments, data store 112 can store information that is utilized by device class year module 102. In some instances, data store 112 can store information associated with device classification criteria, class year device mapping, rules and logic for enabling features by class year, device and/or application performance data while accessing features and services associated with social networking system 630, and the like. It should be appreciated that there can be many variations or other possibilities.

As used herein, a class year or device class year corresponds to the year in which a particular computing device would have generally been considered the best performing device on the market based on a set of performance attributes. Thus, instead of classifying, for example, a computing device, such as user device 610, based on the version of the operating system (OS) running thereon, attribute acquisition module 104 can be configured to communicate with the computing device to acquire a set of attributes associated with device performance to assign the computing device to a class year. In this example, the attributes acquired by attribute acquisition module 104 can include a number of Central Processing Unit (CPU) cores, clock speed, memory, and the like, which can be used to determine the performance capabilities of the computing device. Here, the number of cores, clock speed, and memory are the attributes that, when varied, have the most noticeable impact on device performance and can, thus, be the primary attributes used for classifying a device. Other attributes, such as display screen size, pixel density, battery size, disk capacity, and any other attribute that has an effect on device performance, can also be used.

In order to acquire the performance attributes, attribute acquisition module 104 can, in one example, query the computing device. For example, attribute acquisition module 104 could query the computing device each time the computing device accesses social networking system 630 in order to enable social networking system 630 to determine which features to enable on the computing device. In another example, a user downloads a client-side application associated with social networking system 630 in order to access their account with social networking system 630. In this example, the client-side application could obtain the performance attributes from the computing device and provide information for the same to social networking system 630 each time the user opens the client-side application. In another example, attribute acquisition module 104 could obtain the information for the attributes when the user first downloads the client-side application, stores, and associates this information with the user's account with social networking system 630. Additionally, attribute acquisition module 104 could query for specific attributes individually or query for a respective device model identifier, such as a model number, etc., which attribute acquisition module 104 then uses to lookup or obtain the attributes from a lookup table or other location since the performance attributes for many computing devices are publically available from their manufactures.

Figure 2A:
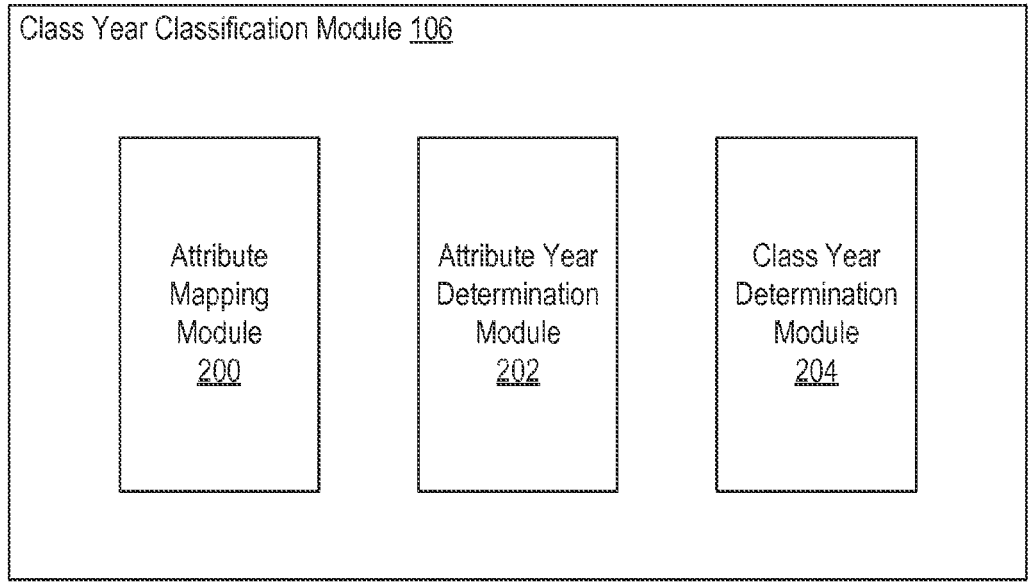
FIG. 2A illustrates an example class year classification module configured to facilitate the classification of computing devices into a device class year, according to an embodiment of the present disclosure.

Once the performance attributes have been acquired for a respective computing device, the attributes can be used to classify the device. Accordingly, in this example, device class year module 102 can utilize class year classification module 106 to facilitate the classification of each computing device into a device class year based on a set of these attributes. FIG. 2A illustrates example class year classification module 106 in accordance with at least one embodiment of the present disclosure. As shown in FIG. 2A, class year classification module 106 can include attribute mapping module 200, attribute year comparison module 202, and class year determination module 204. In this example, attribute mapping module 200 can include a mapping of each attribute to a year when a respective attribute was considered the highest performing attribute offered on a computing device.

Accordingly, attribute year determination module 202 receives the set of attributes associated with device performance from attribute acquisition module 104 and can be configured to compare the set of attributes against information stored in attribute mapping module 200 for determining a class year for each attribute. For example, attribute year determination module 202 could receive information for a particular computing device having a processor with two cores, a clock speed of 1.7 GHz, and 2.0 GB of memory. Attribute year determination module 202 can then determine what year a two core processor was the highest number of processors offered in the market, what year 1.7 GHz was the fastest clock speed available, and what year 2.0 GB of memory was the most offered on a computing device. In this example, attribute year determination module 202 could reference attribute mapping module 200 to determine that 2011 was the first year that a processor with two cores was available, 2013 was the first year that a clock speed of 1.7 GHz was available, and 2013 was the first year that 2.0 GB of memory was available on a computing device.

Class year determination module 204 can receive the attribute class years from attribute year determination module 202 and calculate a device class year. In one example, the class year can be the median of the attribute class years. Thus, returning to the above example, if 2011 was the number of cores attribute year, 2013 was the clock speed attribute year, 2013 was memory attribute year, and no other attributes were considered, the median of 2011, 2013, and 2013 is 2013. Additional attributes can be used and different methods, such as a mean attribute year, can also be used to calculate the class year.

FIG. 3A illustrates example device attribute mapping table 300 in accordance with at least one embodiment. In this example, the highest performing computing device in 2008 had only one core, as was true with devices released in 2009 and 2010. Therefore, if a device had only one core, it would be assigned a year of 2008 for that attribute. Similarly, in 2012, the highest performing device had four cores and this was the same for 2013 and 2014. Thus, if a device had four cores, it would be assigned a year of 2012 even if it was released in 2013 or 2014. Clock speed and memory (RAM) are less discrete relative to a number of cores and encompasses a range of values. For example, in 2013, the fastest clock speed was 2.0 GHz and largest memory was 2.0 GB where these values represent a ceiling of potential 2013 values for these attributes. Thus, anything greater than 1.5 GHz (2012) and less than or equal to 2.0 GHz would be assigned to the year 2013 and anything greater than 2.0 GHz would be assigned to 2014. Thus, each year can correspond to a range of values greater than the values of a previous year. Accordingly, a mapping of each attribute, as shown in device attribute mapping table 300, can be stored in attribute mapping module 200.

For example, FIG. 3B illustrates example class year determination table 302 in accordance with at least one embodiment. In this example, Device A has one core corresponding to an attribute year of 2008, a clock speed of 1.0 GHz corresponding to an attribute year of 2010, and 668 MB of memory corresponding to an attribute year of 2011. Thus, the median of 2008, 2010, and 2011 is 2010, which is assigned as Device A's class year. A similar calculation is performed for Device B through Device E. Thus, the class year can be determined by looking at the attributes or specs of flagship devices across history, and then assigning a range of that attribute to each year. A given device then has each of its attributes translated to a year, based on which range it falls. The year class of the device is then the median of its component attribute class years. It should be appreciated that the class year can be calculated using the mean of the attribute class years instead of the median and that any number of device attributes beyond the number of cores, clock speed, and memory, such as screen size, resolution, or the like, can be used.

Returning to FIG. 1, example system 100 additionally includes example performance analysis module 108 configured to enable the analysis of performance data based on a device class year classification. Accordingly, the device class year enables devices to be segmented by performance, rather than by every individual device. This segmentation can be used in conjunction with other variables, such as device type or screen size or resolution, to determine, for example, whether behavior shifts on different devices are due to performance, screen real estate, or some other variable. While the OS version is still useful for some items, such as reliability and crash benchmarks, class year can provide more accurate portrayal of how performance and behavior can vary between different devices. In addition to analyzing data by class year, performance data analyzed in performance analysis module 108 can be used to implement new product features or optimize existing ones.

In at least one embodiment, feature enablement module 110 can be configured to enable features on or provide features to computing devices based at least in part on the device class year as determined by class year classification module 106 and tuned using performance analysis module 108. As mentioned above, many devices are released each year and the range of performance on these devices is quite broad. Some of these devices released in a year can fluidly scroll complicated layouts without dropping a frame while other devices introduced that same year do not fare as well. Once the devices are grouped into tiers of performance, the performance data from performance analysis module 108 can identify features that cause or are associated with performance problems on certain device class years where they can then be precluded.

Figure 2B:
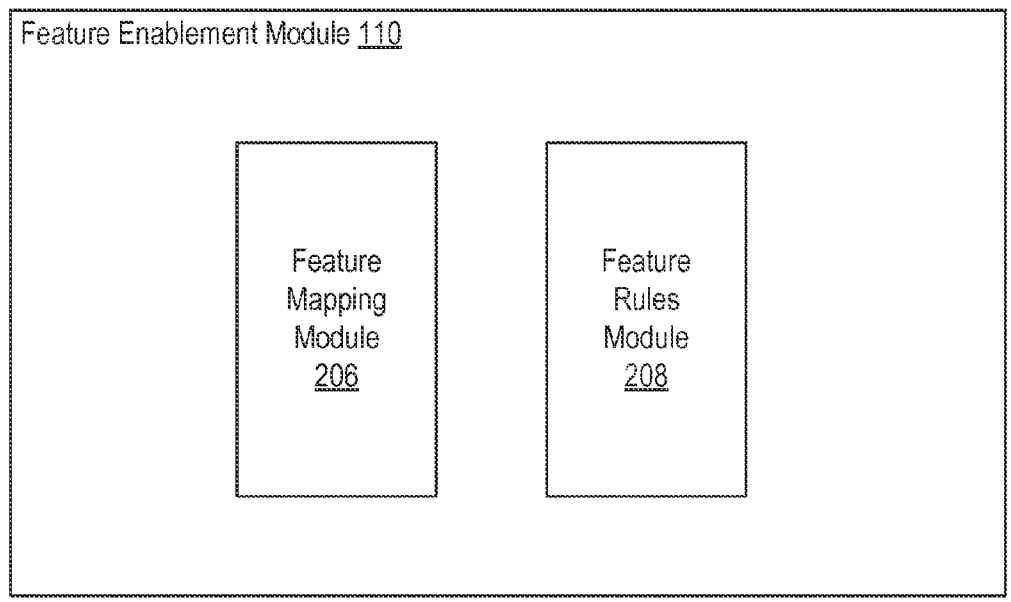
FIG. 2B illustrates an example feature enablement module configured to facilitate the enablement of at least one feature to be provided on the computing device based at least in part on the device class year, according to an embodiment of the present disclosure.

Accordingly, FIG. 2B illustrates example feature enablement module 110 in accordance with at least one embodiment of the present disclosure. As shown in FIG. 2B, feature enablement module 108 can include feature mapping module 206 and feature authorization module 208. In this example, feature mapping module 200 can include a mapping of each feature that is enabled or allowed to be unlocked on a device based on the class year of a respective device.

For example, some features, such as videos, can be launched or played automatically without selection or interaction from a user. In such a situation, a video could automatically start playing as a user scrolls to or past a location of the video on a page. When a computing device has sufficient resources to launch the video while also meeting the demands of other processes executing on the device, a user may not perceive any decrease in device performance. However, when utilizing a device with insufficient resources to perform the aforementioned, such as an older device, a user will likely perceive a decrease in device performance (e.g., choppy or low quality video, slow performance, device crashing, etc.). As such, attempting to provide such features on older or lesser performing devices may end up resulting in a lower quality user experience.

Thus, in this example, feature mapping module 206 can contain a mapping between potential features (e.g., video stories, animations, number of images displayed, higher quality images, etc.) that can be provided to a device and the corresponding device class years for devices with sufficient performance capabilities to execute or perform those potential features. The features to device year mapping can be, for example, determined empirically based on data aggregated or provided by performance analysis module 108. Further, feature rules module 208 can be configured to provide the features on a computing device based on logic or rules defined by feature mapping module 206. Feature rules module 208 will be discussed further with respect to FIG. 3B.

FIG. 3B illustrates an example table of computing devices classified by class year, according to an embodiment of the present disclosure. In this example, Device E could be shown multiple video stories in a news feed based on its class year (2013) while Device B (2011), which may not be able to smoothly play the same number of videos as Device E, is shown only a single video and while Device D (2008) is not shown any videos at all. In another example, feature rules module 208 may also prioritize features that work best on a respective computing device based on a performance level associated with its respective class year. Thus, rules module 208 can determine other logic decisions associated with, for example, animations, the amount of content to load, and other elements of performance.

In at least one embodiment, the computing device may include a client-side application associated with a social network system, such as social networking system 630, through which content and features from the social networking system are provided. In this example, it can be desirable to analyze how usage of client-side application varies on different devices and to potentially tune the behavior of the client-side application to better match the hardware for a respective class year of devices. In one example, using the class year in conjunction with screen resolution can enable the breakdown of metrics to make decisions about why behavior shifts on different devices (e.g., performance, screen size, something else, etc.).

Figure 4:
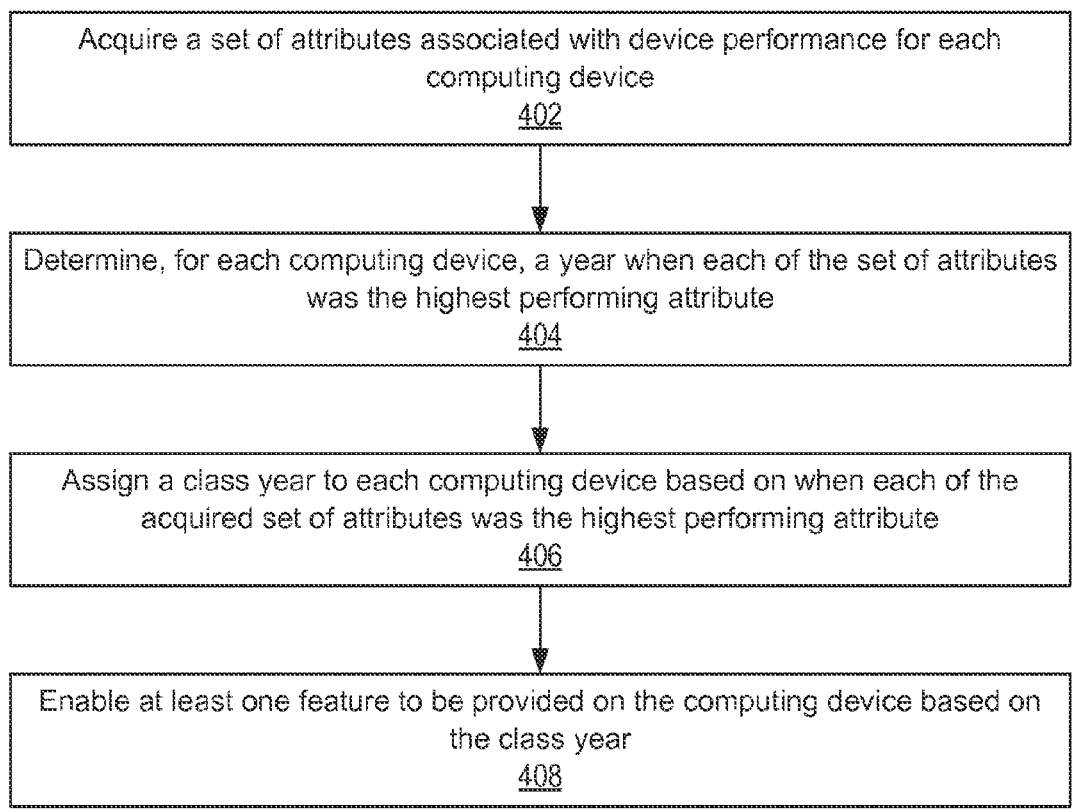
FIG. 4 illustrates an example method associated with the classification of computing devices into a device class year, according to an embodiment of the present disclosure.

FIG. 4 illustrates example method 400 associated with the classification of computing devices into a device class year, according to an embodiment of the present disclosure. It should be appreciated that there can be additional, fewer, or alternative steps performed in similar or alternative orders, or in parallel, within the scope of the various embodiments unless otherwise stated.

At block 402, example method 400 can acquire a set of attributes associated with device performance from computing devices to classify or categorizes a computing device, such as a phone, by the year when that device would have been considered the best device on the market. In one example, the attributes can include processor speed, memory, or a number of central processing unit (CPU) cores. Other such attributes that can also be included are display screen size, display screen pixel density, battery life, or any other variable attribute or feature of the device that may impact device performance.

At block 404, example method 400 can determine, for each computing device, a year when each of the set of attributes was the highest performing attribute. For example, if in 2008, the fastest processor speed available on the market was 528 MHz and a particular computing device released in 2012 has a processor with a clock speed of 528 MHz, the processor attribute year for this computing device would be 2008. At block 406, example method 400 can assign a class year to each computing device based on when each of the acquired set of attributes was the highest performing attribute. At block 408, example method 400 can enable at least one feature to be provided on the computing device based at least in part on the device class year. Many variations are possible.

Figure 5:
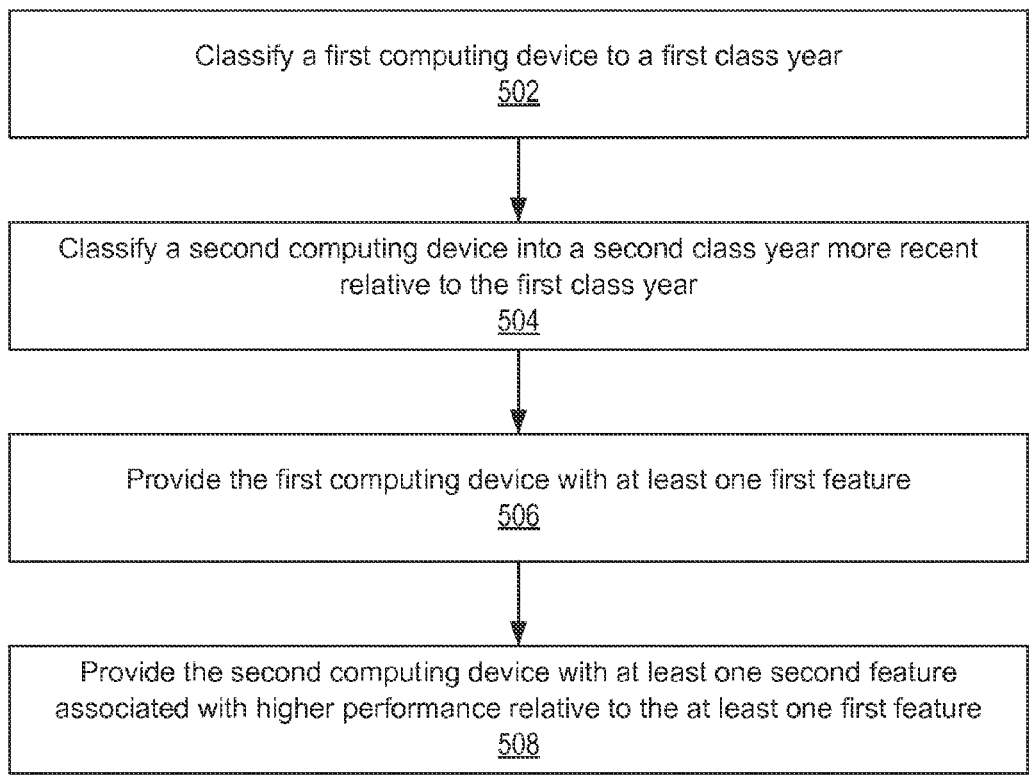
FIG. 5 illustrates an example method associated with the classification of computing devices into a device class year and providing features based on the device class year, according to an embodiment of the present disclosure.

FIG. 5 illustrates example method 500 associated with the classification of computing devices into a device class year and providing features based on the device class year, according to an embodiment of the present disclosure. As discussed above, it should be understood that there can be additional, fewer, or alternative steps performed in similar or alternative orders, or in parallel, within the scope of the various embodiments unless otherwise stated.

At block 502, example method 500 can classify a first computing device into a first device class year and, at block 504, classify a second computing device into a second more recent device class year. At block 506, example method 500 can provide the first computing device with at least one first feature and, at block 508, the second computing device with at least one second feature where the second feature is associated with a higher level of device performance relative to the first feature. In one example, the at least one first feature can be a first number of videos and the at least one second feature is a second larger number of videos. In another example, the at least one first feature can associated with displaying first content at a first frequency and the at least one second feature can be associated with displaying the first content at a second more frequent frequency relative to the first frequency.

Further, based at least in part on the second device class year, the first content can be prioritized on the second computing device over second content and, based at least in part on the first device class year, the second content can be prioritized on the first computing device over the first content since the first content requires a higher level of device performance.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
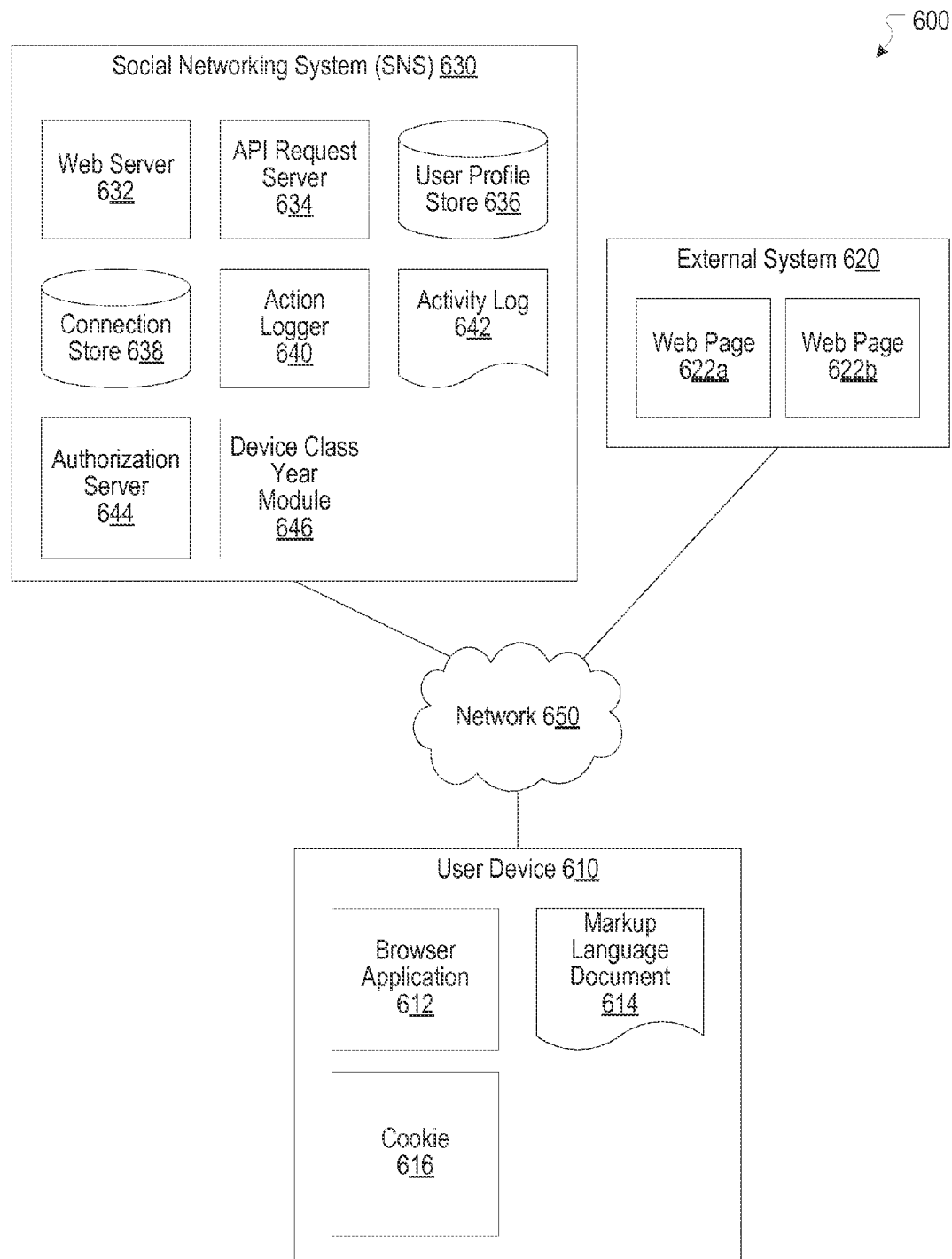
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include device class year module 646. Class year module 646 can, for example, be implemented as class year module 102 of FIG. 1. As discussed previously, it should be appreciated that there can be many variations or other possibilities. Other features of class year module 646 are discussed herein in connection with class year module 102.

Hardware Implementation

Figure 7:
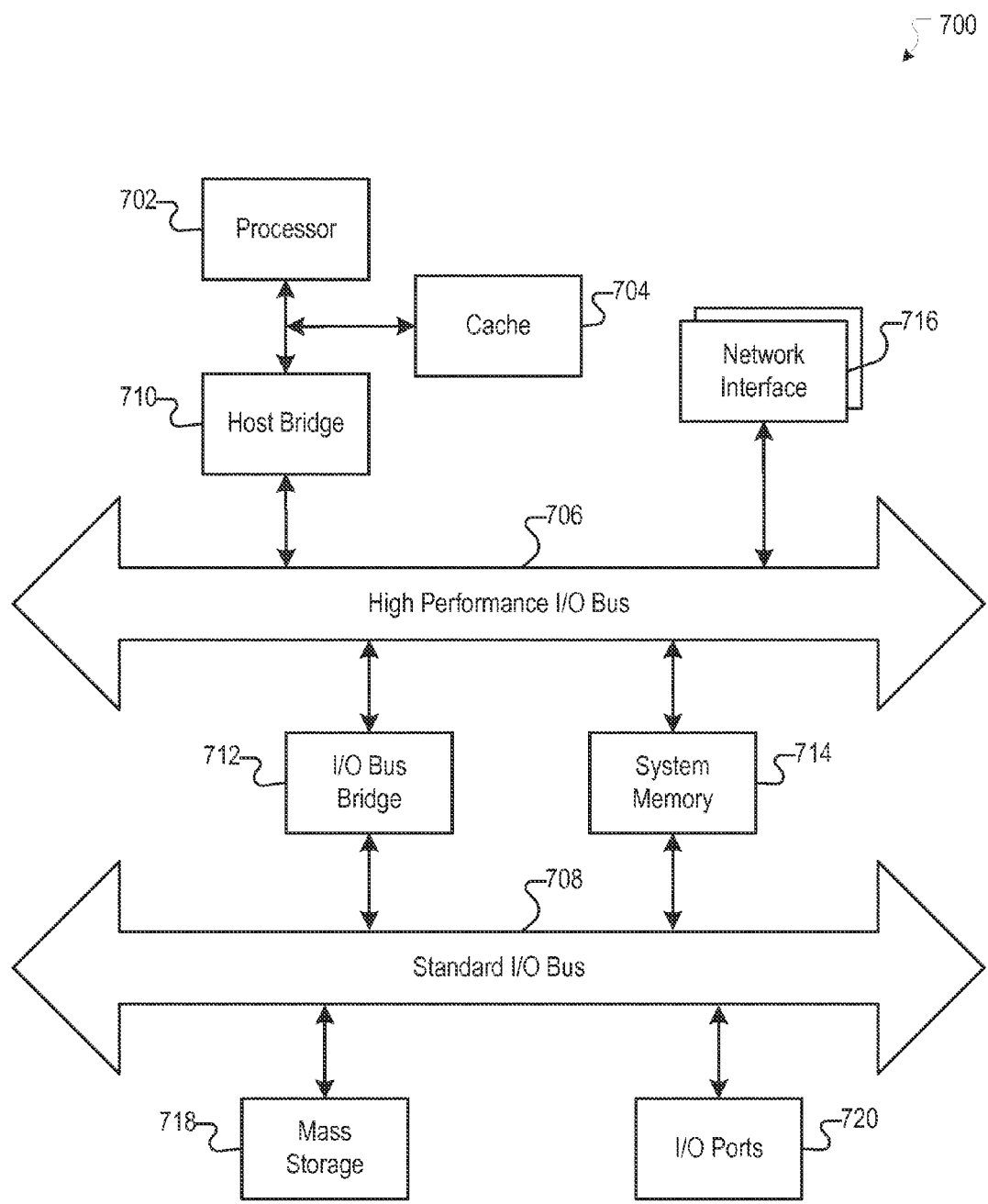
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 702.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    acquiring, by a computing system, a set of attributes for a computing device, the set of attributes being associated with device performance;
    determining, by the computing system, a plurality of attribute class years for the set of attributes;
    classifying, by the computing system, the computing device into a device class year of a plurality of class years based on a mean or a median of the plurality of attribute class years; and
    enabling, by the computing system, at least one feature to be provided on the computing device based at least in part on the device class year.

2. The computer-implemented method of claim 1, wherein the set of attributes includes at least two of processor speed, memory, or a number of central processing unit cores.

3. The computer-implemented method of claim 2, wherein the set of attributes further includes at least one of display screen size, pixel density of the display screen, or battery life.

4. The computer-implemented method of claim 1, further comprising:
    classifying a first computing device into a first device class year;
    classifying a second computing device into a second device class year, the second device class year being more recent relative to the first device class year;
    providing the first computing device with at least one first feature; and
    providing the second computing device with at least one second feature, the at least one second feature being associated with a higher level of device performance relative to the at least one first feature.

5. The computer-implemented method of claim 4, wherein the at least one first feature is a first number of videos and the at least one second feature is a second number of videos larger than the first number.

6. The computer-implemented method of claim 4, wherein the at least one first feature is associated with displaying first content at a first frequency and the at least one second feature is associated with displaying the first content at a second more frequent frequency relative to the first frequency.

7. The computer-implemented method of claim 6, further comprising:
    prioritizing, based at least in part on the second device class year, the first content on the second computing device over second content; and
    prioritizing, based at least in part on the first device class year, the second content on the first computing device over the first content, the first content requiring the higher level of device performance.

8. A system comprising:
    at least one processor; and
    a memory storing instructions that, when executed by the at least one processor, cause the system to perform:
        acquiring a set of attributes for a computing device, the set of attributes being associated with device performance;
        determining a plurality of attribute class years for the set of attributes;
        classifying the computing device into a device class year based on a mean or median of the plurality of attribute class years; and
        enabling at least one feature to be provided on the computing device based at least in part on the device class year.

9. The system of claim 8, wherein the set of attributes includes at least two of processor speed, memory, or a number of central processing unit cores.

10. The system of claim 8, wherein the memory including the instructions that when executed by the at least one processor, further causes the at least one processor to perform:
    classifying a first computing device into a first device class year;
    classifying a second computing device into a second device class year, the second device class year being more recent relative to the first device class year;
    providing the first computing device with at least one first feature; and
    providing the second computing device with at least one second feature, the at least one second feature being associated with a higher level of device performance relative to the at least one first feature.

11. The system of claim 10, wherein the at least one first feature is associated with displaying first content at a first frequency and the at least one second feature is associated with displaying the first content at a second more frequent frequency relative to the first frequency.

12. The system of claim 11, wherein the memory including the instructions that when executed by the at least one processor, further causes the at least one processor to perform:
prioritizing, based at least in part on the second device class year, the first content on the second computing device over second content; and
prioritizing, based at least in part on the first device class year, the second content on the first computing device over the first content, the first content requiring the higher level of device performance.

13. A non-transitory computer-readable storage medium including instructions that, when executed by at least one processor of a computing system, cause the computing system to perform:
acquiring a set of attributes for a computing device, the set of attributes being associated with device performance;
determining a plurality of attribute class years for the set of attributes;
classifying the computing device into a device class year based on a mean or median of the plurality of attribute class years; and
enabling at least one feature to be provided on the computing device based at least in part on the device class year.

14. The non-transitory computer-readable storage medium of claim 13, wherein the set of attributes includes at least two of processor speed, memory, a number of central processing unit cores, display screen size, pixel density of the display screen, or battery life.

15. The non-transitory computer-readable storage medium of claim 13, wherein the memory including the instructions that, when executed by the at least one processor, further causes the computing system to perform:
classifying a first computing device into a first device class year;
classifying a second computing device into a second device class year, the second device class year being more recent relative to the first device class year;
providing the first computing device with at least one first feature; and
providing the second computing device with at least one second feature, the at least one second feature being associated with a higher level of device performance relative to the at least one first feature.

16. The non-transitory computer-readable storage medium of claim 15, wherein the at least one first feature is a first number of videos and the at least one second feature is a second number of videos larger than the first number.

17. The non-transitory computer-readable storage medium of claim 15, wherein the at least one first feature is associated with displaying first content at a first frequency and the at least one second feature is associated with displaying the first content at a second more frequent frequency relative to the first frequency.

* * * * *